United States Patent

Horwitz et al.

Patent Number: 5,406,587
Date of Patent: Apr. 11, 1995

[54] ERROR TRACKING LOOP

[75] Inventors: Thomas P. Horwitz, Elgin; Ronald B. Lee, Northbrook; Gopalan Krishnamurthy, Wheeling, all of Ill.

[73] Assignee: Zenith Electronics Corporation, Glenview, Ill.

[21] Appl. No.: 14,889

[22] Filed: Feb. 8, 1993

[51] Int. Cl.$^6$ .......................... H04L 5/12; H03D 1/00; H03D 1/04; H03D 1/06
[52] U.S. Cl. ................................... 375/346; 375/340; 375/344; 375/348; 375/349; 375/261
[58] Field of Search .................. 375/94, 97, 98, 99, 375/101, 102, 39

[56] References Cited

U.S. PATENT DOCUMENTS

| | | | |
|---|---|---|---|
| 3,800,228 | 3/1974 | Acker | 325/323 |
| 3,849,730 | 11/1974 | Yu-Shang-Ho | 325/329 |
| 4,947,409 | 8/1990 | Raith | 375/97 |
| 5,157,697 | 10/1992 | Anvari | 375/102 |
| 5,177,611 | 1/1993 | Gibson | 358/167 |
| 5,260,974 | 11/1993 | Johnson | 375/76 |

FOREIGN PATENT DOCUMENTS 0244057 4/1987 European Pat. Off. .

Primary Examiner—Edward L. Coles, Jr.
Assistant Examiner—John Ning

[57] ABSTRACT

A circuit for error correcting a received complex data signal comprises a synchronous detector for recovering an in-phase data component from the received signal and a Hilbert transform filter for estimating the related quadrature component from the recovered in-phase data component, the recovered in-phase data component including a periodically recurring reference signal. A decision feedback loop is periodically operable in response to the reference signal for initially error correcting a selected characteristic of the received signal at a first relatively rapid rate and for subsequently error correcting the selected characteristic at a rate which is less than the first rate and which is dependent upon the estimated S/N ratio of the received signal. In one embodiment, phase errors are corrected at a rate which is also directly related to the value of the estimated quadrature component. In another embodiment, amplitude errors, e.g. gain and offset, are corrected at a rate which is inversely related to the value of the estimated quadrature component.

47 Claims, 5 Drawing Sheets

Fig. 7

| -12 | -6 | -3 | 0 | 0 | 3 | 6 | 12 |
|---|---|---|---|---|---|---|---|
| -8 | -4 | -2 | 0 | 0 | 2 | 4 | 8 |
| -4 | -2 | -1 | 0 | 0 | 1 | 2 | 4 |
| 0 | 0 | 0 | 0 | 0 | 0 | 0 | 0 |
| 0 | 0 | 0 | 0 | 0 | 0 | 0 | 0 |
| 4 | 2 | 1 | 0 | 0 | -1 | -2 | -4 |
| 8 | 4 | 2 | 0 | 0 | -2 | -4 | -8 |
| 12 | 6 | 3 | 0 | 0 | -3 | -6 | -12 |

Fig. 8

| 0 | -6 | -12 | -24 | -24 | -12 | -6 | 0 |
|---|---|---|---|---|---|---|---|
| 0 | -4 | -8 | -16 | -16 | -8 | -4 | 0 |
| 0 | -2 | -4 | -8 | -8 | -4 | -2 | 0 |
| 0 | 0 | 0 | 0 | 0 | 0 | 0 | 0 |
| 0 | 0 | 0 | 0 | 0 | 0 | 0 | 0 |
| 0 | 2 | 4 | 8 | 8 | 4 | 2 | 0 |
| 0 | 4 | 8 | 16 | 16 | 8 | 4 | 0 |
| 0 | 6 | 12 | 24 | 24 | 12 | 6 | 0 |

Fig. 9A

| 0 | -2 | -4 | -8 | -8 | -4 | -2 | 0 |
|---|---|---|---|---|---|---|---|
| 0 | -2 | -4 | -8 | -8 | -4 | -2 | 0 |
| 0 | -2 | -4 | -8 | -8 | -4 | -2 | 0 |
| 0 | 0 | 0 | 0 | 0 | 0 | 0 | 0 |
| 0 | 0 | 0 | 0 | 0 | 0 | 0 | 0 |
| 0 | 2 | 4 | 8 | 8 | 4 | 2 | 0 |
| 0 | 2 | 4 | 8 | 8 | 4 | 2 | 0 |
| 0 | 2 | 4 | 8 | 8 | 4 | 2 | 0 |

ERROR TRACKING LOOP

BACKGROUND OF THE INVENTION

The present invention generally relates to the reception of digital data transmitted as modulation of selected radio frequency (RF) signals and particularly concerns novel circuitry for reducing errors in the received digital data.

Many signal receivers, including television receivers, designed for receiving data transmitted in a digital format use a double conversion tuner at the receiver front end. The first local oscillator of such receivers typically exhibits a relatively high level of phase noise which, together with other sources of phase noise tends to reduce the eye openings of the demodulated digital data. An excessive level of uncompensated phase noise may thereby contribute to an unacceptable error rate in the demodulated data, especially in the case of a relatively tightly packed data constellation.

In addition, the demodulated data may be degraded by amplitude errors resulting in the data being recovered with undesired offsets and/or at undesired levels of gain. These amplitude-related errors also tend to reduce the eye openings of the demodulated data and, as in the case of phase noise, if left uncorrected may lead to an unacceptable error rate, especially in the case of tightly packed data constellations.

It is therefore a basic object of the present invention to provide an improved system for correcting errors in a demodulated digital data signal.

It is a more specific object of the invention to provide an improved system for reducing the phase noise induced error rate of a demodulated digital data signal.

It is another object of the invention to provide an improved system for reducing amplitude errors in a demodulated digital data signal.

It is a further object of the invention to provide an improved system for rapidly tracking and correcting errors in a demodulated digital data signal.

It is yet another object of the invention to provide an improved system for correcting errors in a demodulated digital data signal in relation to the signal-to-noise (S/N) ratio of the received signal.

BRIEF DESCRIPTION OF THE DRAWINGS

These and other objects and advantages of the invention will be apparent upon reading the following description in conjunction with the drawings, in which:

FIGS. 6–9 illustrate, in an exemplary form, the contents of the various LUT's of the error tracking circuit of FIG. 4; and, FIGS. 10 and 11 are further vector diagrams useful in explaining the operation of the error tracking circuit of FIG. 4.

DESCRIPTION OF THE PREFERRED EMBODIMENT

Without intending to impose any limitations on the scope of the invention, the preferred embodiment set forth hereinafter is described in terms of a digital television signal transmission system. The system may, for example, be used to digitally transmit one or more NTSC signals or one or more HDTV signals and preferably, although not necessarily, is of the type disclosed in U.S. Pat. Nos. 5,087,975 and 5,181,112, which are incorporated by reference herein.

The system described in the foregoing patents employs a vestigial sideband (VSB) form of transmission in which digital data is transmitted as a plurality of multi-level symbols over a selected RF channel. The data symbols are transmitted with a small pilot to facilitate carrier recovery in the receiver and may comprise four levels having the relative values $-2$, $0$, $+2$ and $+4$. The transmission is formatted to provide successive data fields, each field comprising a plurality of data segments. Each data field includes a data segment comprising a relatively rugged two-level vertical reference signal and each data segment includes four successive two-level symbols comprising a relatively rugged data segment synchronizing character. The vertical reference signal and data segment synchronizing character occur at NTSC vertical and horizontal rates respectively.

Figure 1:
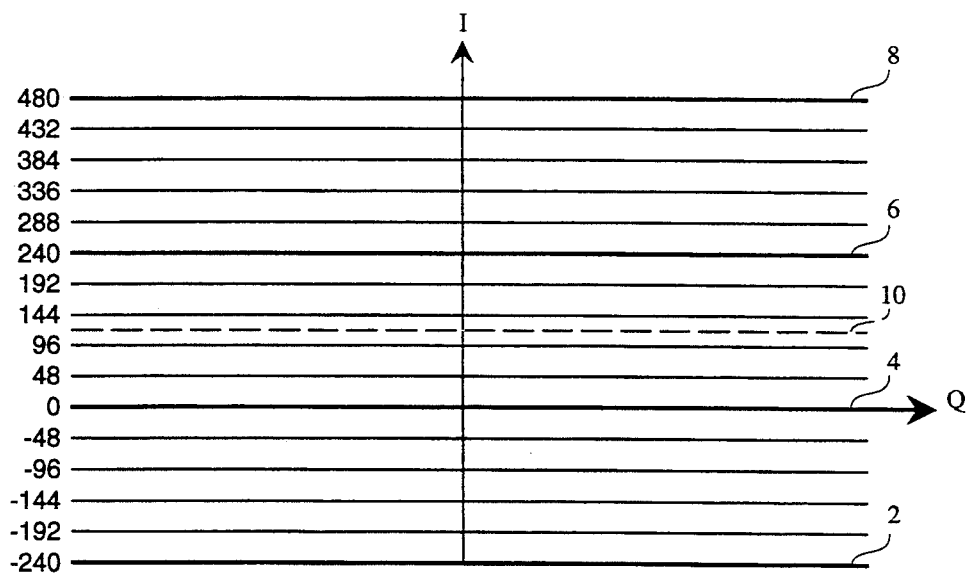
FIG. 1 is a chart depicting two data constellations useful in explaining the operation of the invention.

The multilevel digital data is recovered in a receiver as the in-phase (I) component of a suppressed carrier, the related quadrature (Q) component resulting from the VSB form of transmission being generally ignored. An idealized exemplary constellation of the demodulated digital data signal is illustrated in FIG. 1 and will be seen to comprise a plurality of horizontal lines 2, 4, 6 and 8 intersecting the I axis at the relative data levels $-2$, $0$, $+2$ and $+4$. Assuming purely random data, a pilot is thereby provided at relative level $+1$ as represented by dotted line 10. While a constellation comprising four data levels is believed optimum for use in a terrestial broadcast environment, a constellation comprising sixteen data levels, represented by the sixteen horizontal lines of FIG. 1, may be used for cable transmission. It will be appreciated that while the sixteen level constellation of FIG. 1 provides double the data rate of the four level constellation, it is much more tightly packed and therefore more sensitive to errors in data recovery. Independent of the size of the constellation, due to the VSB form of transmission, each data level is characterized by a continuous range of Q values which are a direct function of the time rate of change of the I data levels.

There are two types of errors which may affect the ability of the receiver to accurately recover the data represented by the constellations of FIG. 1; errors due to amplitude noise and errors due to phase noise. Amplitude noise induced errors cause each of the horizontal data level lines to become uniformly fuzzy in the Q direction, while phase noise induced errors cause each of the data level lines to increase in fuzziness as Q increases. Thus, phase noise introduces errors in the demodulated signal which increases directly with larger values of Q. The effect of phase noise on the demodulated signal is illustrated in the partial constellation of FIG. 2. Assume that a demodulated data symbol is represented by vector $V_1$ having I and Q components $I_1$ and $Q_1$ respectively. If vector $V_2$, which corresponds to a data level I₂, was transmitted, then the vector V₁ varies from the correct vector V₂ by an angle T representing the phase noise characterizing the demodulated signal. It will be seen that for the same amount of phase noise, i.e. represented by angle T, the variation from valid data level I₂ increases linearly with Q thereby defining a triangular phase noise envelope E on either side of the I axis. Thus, an amount of phase noise represented by angle T will cause correct vector V₄ to be demodulated as vector V₃ and correct vector V₆ to be demodulated as vector V₅. It will be appreciated that similar errors will result in the demodulated data for negative values of Q and for phase noise corresponding to angles of the opposite direction.

Figure 2:
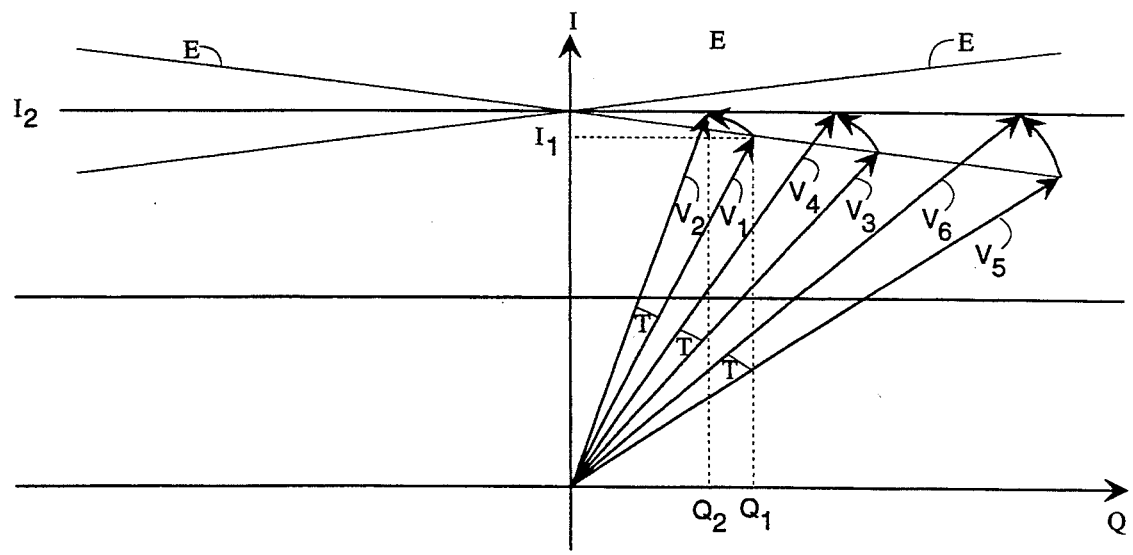
FIG. 2 is a vector diagram illustrating the effects of phase noise in the demodulated constellations of FIG. 1.

With further reference to FIG. 2, it will be appreciated that correction of demodulated vector V₁, which becomes more critical as the packing density of the constellation increases, requires a counterclockwise rotation of the vector by angle T to the position of vector V₂. Demodulated vectors V₃ and V₅ may similarly be corrected by counterclockwise rotation of the vectors through angle T to the positions of vectors V₄ and V₆ respectively. Thus, for example, corrected vector V₂ may be calculated from demodulated vector V₁ using the trigonometric identity:

$I_2 = I_1 \cos T - Q_1 \sin T$ $Q_2 = I_1 \sin T + Q_1 \cos T$

Figure 3:
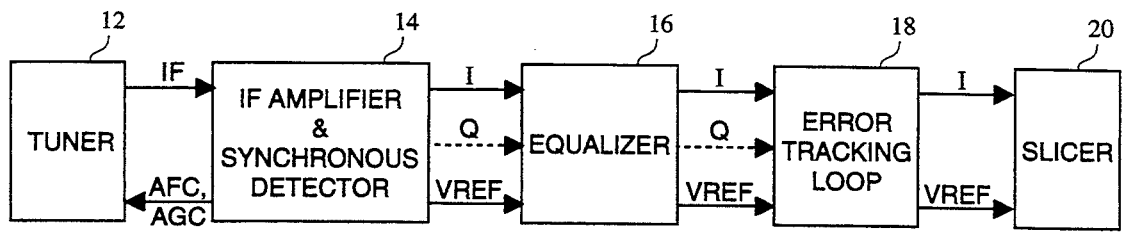
FIG. 3 is a simplified block diagram of an HDTV receiver incorporating the present invention.

A receiver including a circuit for effecting the foregoing correction is generally shown in FIG. 3. The transmitted signal is received by a tuner 12, which may comprise a double conversion tuner whose first local oscillator stage introduces a relatively large amount of phase noise into the received signal. The output of tuner 12 is applied to an IF amplifier and synchronous detector 14 which develops the demodulated I and Q components of the data signal. The use of pilot 10 in the transmitted signal facilitates rapid recovery in IF amplifier and synchronous detector 14 of a carrier signal. After demodulation of the received signal in response to the recovered carrier, the data segment synchronizing character is recovered which, in turn, allows for rapid recovery of a data clock and the vertical reference signal. The synchronous detector may itself be capable of tracking phase noise between about 1 to 2 KHz, which may be adequate for some forms of the transmitted signal, but not where a relatively large number of data levels are used within a tightly packed constellation, such as the sixteen level constellation illustrated in FIG. 1.

The I component of the demodulated data signal is processed by a channel equalizer 16 and then coupled to an error tracking loop circuit 18. As will be described in more detail hereinafter, circuit 18 tracks the phase noise for correcting errors in the demodulated data by appropriately rotating the data vectors in accordance with the above trigonometric identity. Finally, the corrected demodulated data signal is applied from circuit 18 to a slicer 20 for conversion to corresponding data states.

Figure 4:
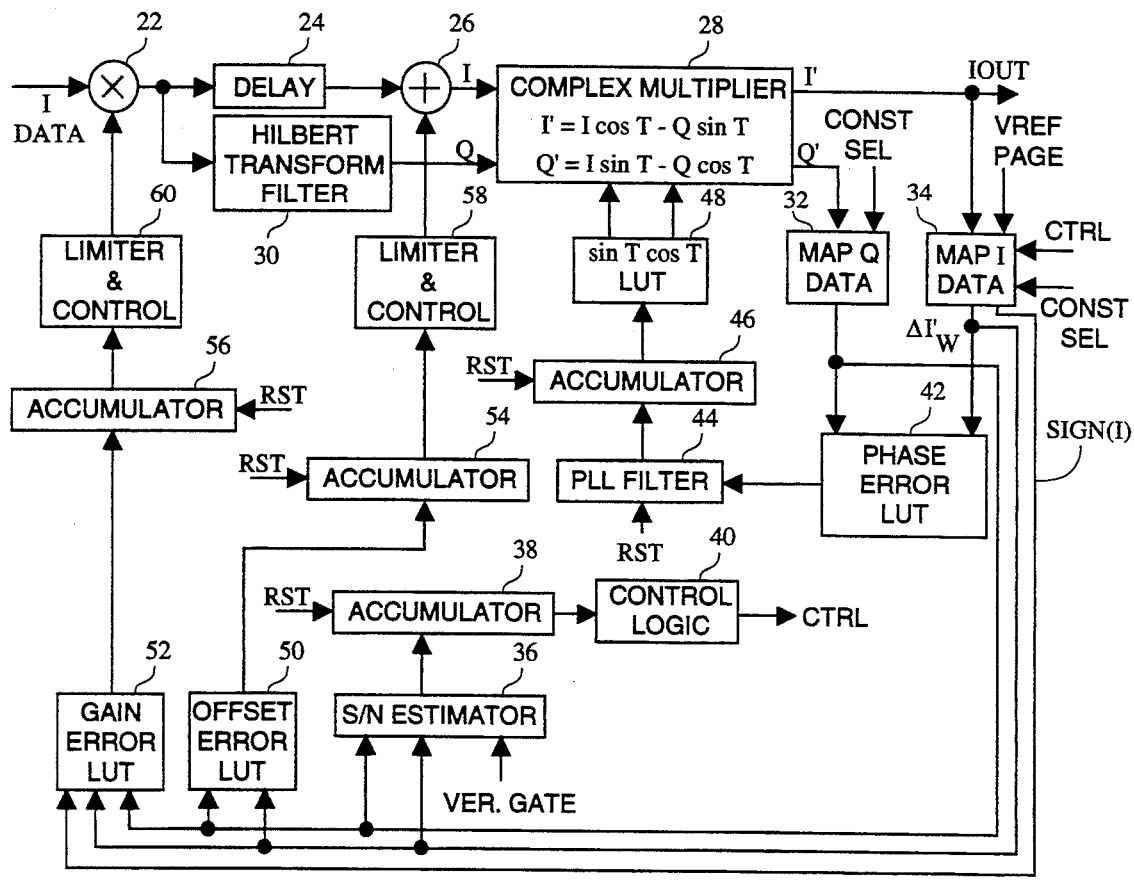
FIG. 4 is a more detailed block diagram of the error tracking circuit shown in FIG. 3.

Phase noise tracking loop circuit 18 is shown in more detail in FIG. 4. The I component of the demodulated data signal is applied from IF amplifier and synchronous detector 14 to a gain adjustment multiplier 22, the output of which is applied through a delay circuit 24 and an offset adjustment summer 26 to one input of a complex multiplier 28. In the illustrated embodiment, equalizer 16 does not process the Q component of the demodulated data signal to minimize cost. Therefore, the equalized I component is applied to a Hilbert transform filter 30 whose output approximates the corresponding Q component of the data signal, which is then applied to a second input of complex multiplier 28. Hilbert transform filter may comprise, for example, an 8-bit, 48 tap FIR filter. Delay circuit 24 is provided in the path of the I component of the demodulated data signal to match the delay of the Q component introduced by Hilbert transform filter 30. It will be understood that, if desired, the Q component from synchronous detector 14 could be processed by equalizer 16 as represented by the dashed lines, in which case delay 24 and Hilbert transform filter 30 would not be required. Complex multiplier 28 corrects the applied I and Q components in accordance with the foregoing trigonometric identity to provide corrected 10-bit output components I' and Q'.

The phase noise angle used to control multiplier 28 is derived in a decision feedback loop which incrementally adjusts the applied data vectors until they have been sufficiently rotated in the appropriate direction to account for the phase noise error in the demodulated signal. In terms of the demodulation constellation, this will have the effect of converging the diverging phase noise envelopes E of FIG. 2 to the horizontal lines of FIG. 1.

Figure 5:
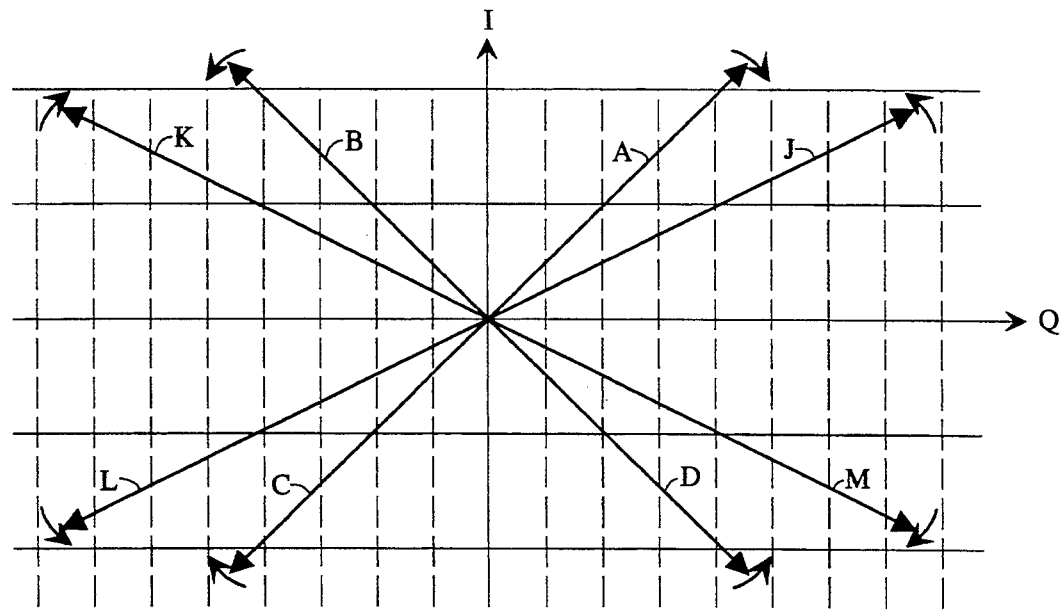
FIG. 5 is a vector diagram useful in explaining the operation of the error tracking circuit of FIG. 4.

With further reference to FIG. 4, the 10-bit Q' output of multiplier 28 is mapped to corresponding 4-bit values by a lookup table (LUT) 32 thereby effectively dividing the Q axis of the data constellation into 16 regions which are preferably symmetric about the I axis as shown in FIG. 5. The 10-bit I' output of multiplier 28 is mapped to a a 1-bit signal representing the sign of the I' component (i.e. positive or negative) and a 7-bit value representing the difference between I' and the closest valid I data level by a LUT 34. Positive difference values are provided for values of I' above the closest valid I data level and negative difference values are provided for values of I' below the closest valid I data level.

Figure 6:
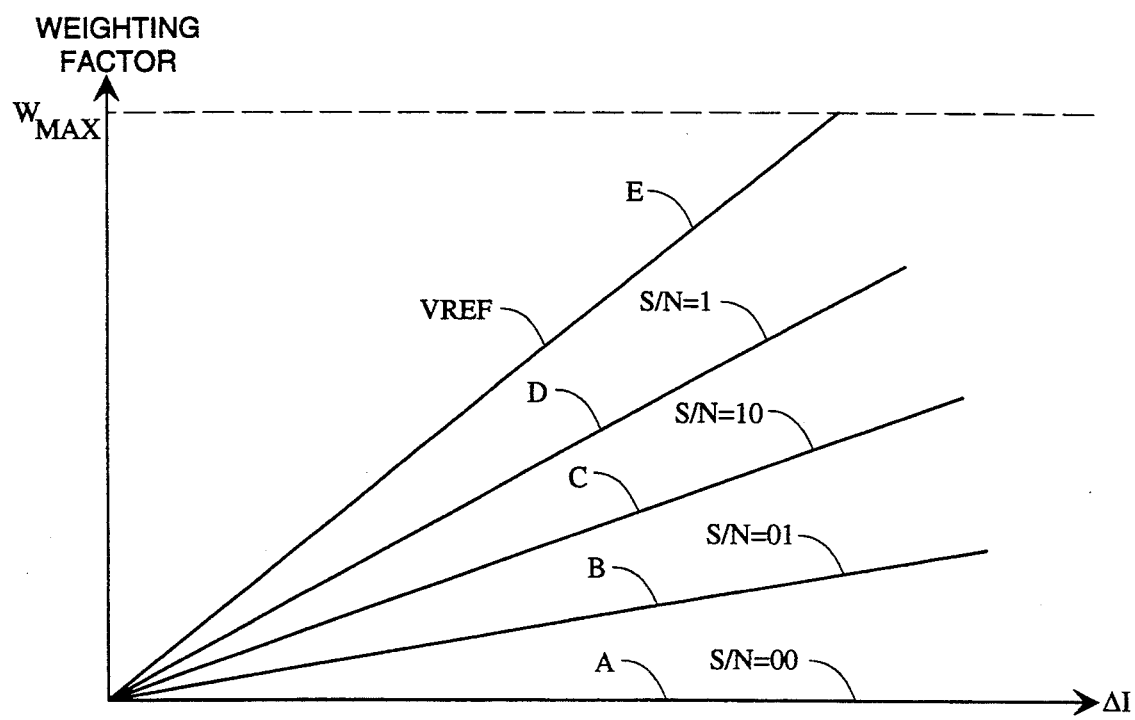

The magnitude of the difference values provided by LUT 34 are derived according to a further aspect of the invention as illustrated by the graph of FIG. 6. FIG. 6 represents five memory pages A-E comprising the contents of LUT 34 which are selectively utilized for controlling the gain of the decision feedback loop. For each page A-E, a weighting factor W (having a range between zero-$W_{max}$) is derived in response to the difference between I' and the closest valid I data level, with the derived factor W increasing with increasing values of this difference. The unweighted difference $\Delta I'$ is multiplied with the derived weighting factor W to supply a 7-bit weighted difference output value $\Delta I'_w$. Since the slopes of the curves representing the memory pages increases from page A to page E, the weighting factor W for a given unweighted $\Delta I'$ likewise increases from page A to page E. As a result, the weighted output difference $\Delta I'_w$ also increases from page A to page E which, as will be explained hereinafter, will have the effect of controlling the gain (i.e. the response time) of the decision feedback loop.

The first four memory pages A-D of LUT 34 are selected on the basis of the S/N ratio characterizing the received signal. Thus, for a S/N ratio below a predetermined threshold memory page A is selected so that the output weighted difference $\Delta I'_w$ is zero for all input values and no correction is effected. As the S/N ratio of the received signal increases above the threshold, memory page B, C or D is selected to provide respectively increasing levels of gain. Finally, page E is selected to provide the highest level of gain during a time period coincident with the vertical reference signal in response to a vertical page select signal. As a result, very rapid correction will be effected during the vertical reference signal of each data field, with the rate of correction during the remainder of the field being a function of the S/N ratio characterizing the received signal. In particular, the rate of correction will be reduced for low levels of S/N and increased for high levels of S/N.

The selection of memory pages A-D of LUT 34 is controlled by a S/N estimator 36. S/N estimator 36 is responsive to a vertical reference gating signal for squaring the outputs of LUT's 32 and 34 to provide an estimate of the power of the noise characterizing the relatively rugged 2-level vertical reference signal. The noise power estimate is accumulated in an accumulator 38, which is reset at the beginning of each vertical reference signal, to provide an estimate of the S/N characterizing the vertical reference signal and thereby the received data signal. This S/N estimate is then quantized to a two-bit control signal by a control logic circuit 40 for application to LUT 34. Values of the S/N estimate below the predetermined threshold are quantized as control signal 00 for selecting memory page A of LUT 34 and values above the threshold are quantized as control signal 01, 10 and 11 for selecting pages B, C and D, respectively.

The mapped 4-bit output of LUT 32 and the mapped 7-bit output of LUT 34 are applied to a phase error LUT 42. Phase error LUT 42, in response to the inputs from LUT's 32 and 34, develops an output representing the direction and incremental amount of rotation to be imposed on the demodulated data vector I, Q applied to complex multiplier 28 to correct for phase noise characterizing the signal. Thus, if the difference value from LUT 34 represents a positive value (e.g. vectors A and B in FIG. 5), the direction of rotation is clockwise if Q is positive (vector A) and counterclockwise if Q is negative (vector B). If, on the other hand, the difference value from LUT 34 is negative (vectors C and D), the direction of rotation is counterclockwise if Q is positive (vector D) and clockwise if Q is negative (vector C). In a similar fashion, it will be seen that the rotation of vectors J and L is counterclockwise and vectors K and M is clockwise.

The amount of the incremental rotation represented by the output of LUT 42 may be a fixed relatively small value or preferably may increase from a relatively small value with increasing values of Q and $\Delta I'_w$. Using larger incremental rotational values for larger values of $\Delta I'_w$ may be desirable to more rapidly correct the larger magnitudes of phase error associated with larger values of $\Delta I'_w$. Using larger incremental rotational values for larger values of Q may be desirable to account for the higher probability that the associated error is due to phase noise than to amplitude noise.

The operation of LUT 42 is shown in more detail in the exemplary chart of FIG. 7. This chart shows the amount and direction of the incremental rotation to be applied to the input vector I, Q for different outputs of LUT's 32 and 34. A value in the chart having a positive sign indicates rotation in a clockwise direction and a value having a negative sign indicates rotation in a counterclockwise direction. Thus, rotation is in a clockwise direction if the outputs of LUT's 32 and 34 are both of the same sign and counterclockwise if the signs are different. For all values of Q below a selected threshold the amount of incremental rotation is zero and then, above a selected threshold of $\Delta I'_w$ increases with increasing values of Q. This is desirable because, as previously explained, the probability that a given amount of error is due to phase noise increases with Q. It will also be seen that, for inputs above the foregoing thresholds, the amount of incremental rotation increases with increasing values of $\Delta I'_w$. This, in cooperation with the multiple page memory of LUT 34, permits selective control of the rate of phase error correction of the decision feedback loop. That is, larger amounts of incremental rotation are provided by LUT 42 during the vertical reference signal and for higher values of S/N to increase the rate of phase error correction under such conditions.

The output of LUT 42 is applied through a PLL filter 44 to an accumulator 46. Accumulator 46, which is reset at the beginning of each data field by a reset signal derived from the vertical reference signal recovered by detector 14, accumulates the filtered output of LUT 42 to provide an output representing the phase angle error of the demodulated vector I, Q. This phase angle error is converted to corresponding sine and cosine values by a LUT 48 which are then applied to multiplier 28 for rotating the input vector toward the correct output vector. It will thus be appreciated that the decision feedback loop is periodically operated in response to the vertical reference signal for reducing the phase noise characterizing the received signal; initially by rapidly rotating the input vector to a determined corrected position and then, at a slower rate, by tracking phase noise variations in the received signal.

As previously explained, demodulated data characterized by small values of Q exhibit very little error due to phase noise. Any appreciable errors in such data are therefore most likely due to undesired amplitude variations such as offset errors and gain errors. Therefore, in accordance with another aspect of the invention, the Q and $\Delta I'_w$ outputs of LUT's 32 and 34 are applied to offset error and gain error LUT's 50 and 52 respectively. Gain error LUT 52 also receives the single bit output of LUT 34 representing the sign of I'. Generally speaking, LUT's 50 and 52 develop respective output error values for small values of Q to compensate the demodulated data for undesired levels of offset or gain. These error values are accumulated during each data field in respective accumulators 54 and 56, which are also reset at the beginning of each data field by a reset signal. Accumulator 54 applies the accumulated offset error signal through a limiter and control unit 58 to summer 26 for appropriately adjusting the offset of the demodulated data signal and accumulator 56 applies the accumulated gain error signal through a limiter and control unit 60 to multiplier 22 for appropriately adjusting the gain of the I component of the demodulated data signal.

The operation of LUT's 50 and 52 are shown in more detail in the exemplary charts of FIGS. 8 and 9. The chart of FIG. 8 represents LUT 50 which is programmed for compensating amplitude offset errors in the demodulated data signal. Referring to FIG. 10, such errors may be represented by the combination of vectors A and M, which are both offset above their respective valid levels by a corresponding amount Y, or by the combination of vectors J and D which are both offset below their respective valid levels by a corresponding amount Y. Positive offsets (e.g. vectors A and M) result in positive values of $\Delta I'_w$ from LUT 34 which in turn provide negative offset error signals from LUT 50. As a result, the offset error signal developed by accumulator 54 is decreased reducing the offset of the demodulated data to provide corrected vectors A' and M'. Negative offsets (e.g. vectors J and D) result in negative values of $\Delta I'_w$ from LUT 34 which in turn provide positive offset error signals from LUT 50. The offset error signal developed by accumulator 54 is therefore increased to increase the offset of the demodulated data to provide corrected vectors J' and D'. It will be observed that, in both cases, the offset adjustment is much more sensitive for small values of Q where amplitude errors in the demodulated data are predominant. The amount of adjustment also increases with increasing $\Delta I'_w$ and at a controllable rate as previously described.

Figure 9B:
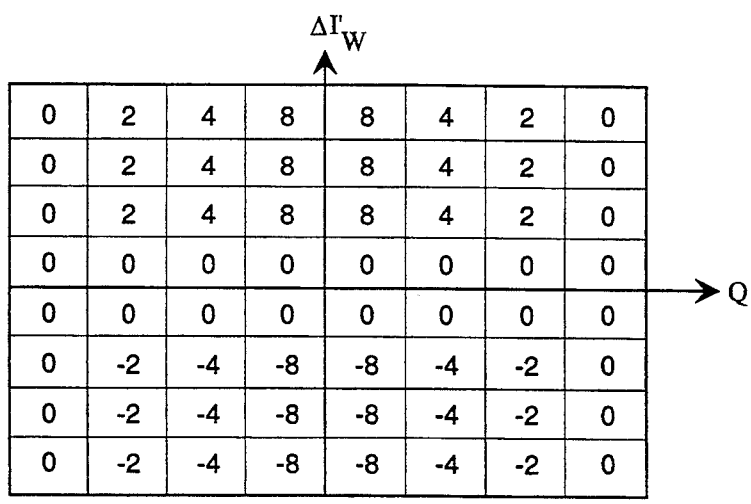
Figure 10:
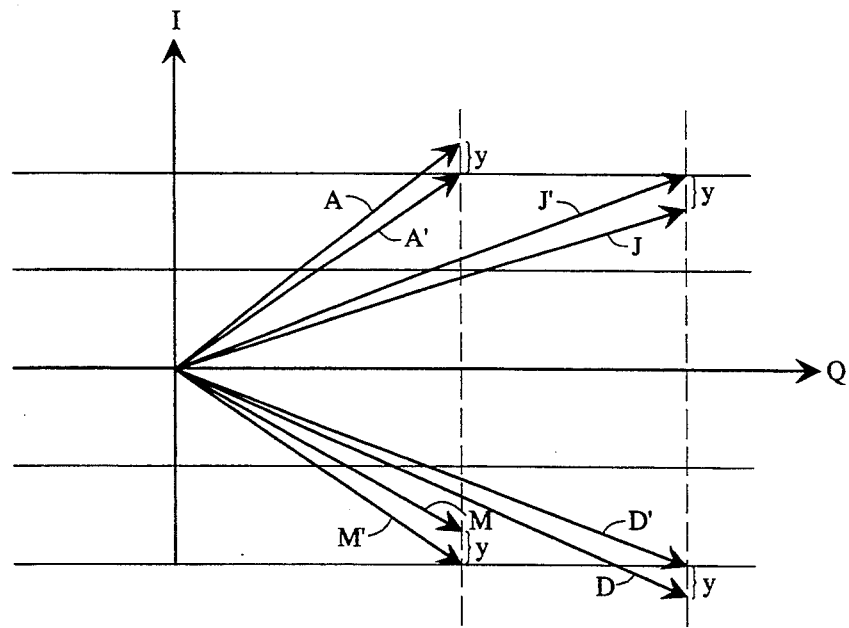
Figure 11:
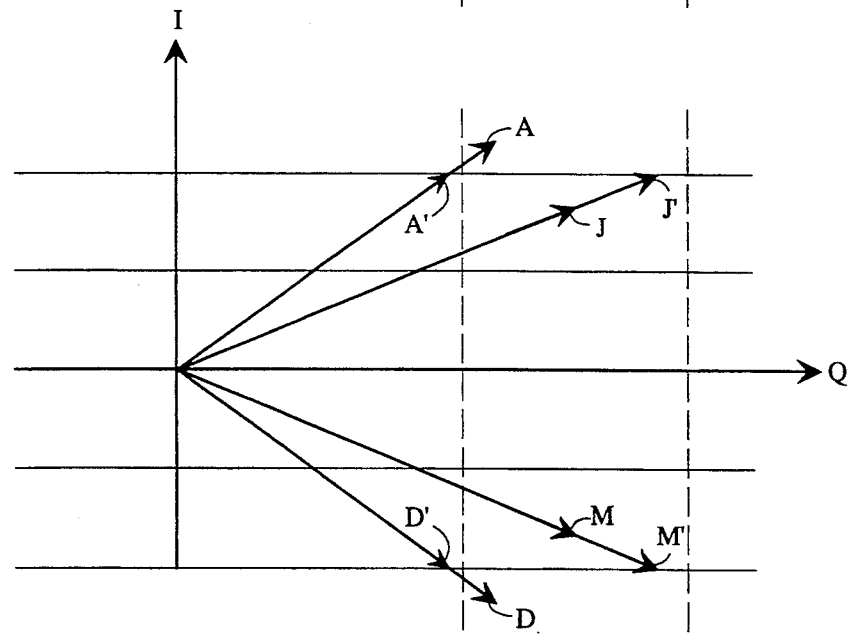

The charts of FIGS. 9A and 9B represent LUT 52 and are programmed for compensating amplitude gain errors in the demodulated data signal. The charts of FIGS. 9A and 9B are selected by the sign bit from LUT 34 (representing positive or negative values of I'), with the chart of FIG. 9A being selected for positive values of I' and the chart of FIG. 9B for negative values of I'. Referring to FIG. 11, such errors may be represented by either the combination of vectors A and D (excessive gain) or the combination of vectors J and M (insufficient gain). In the example of excessive gain, vector A results in a positive value of $\Delta I'_w$ from LUT 34 so that a negative gain error value is read from the chart of FIG. 9A (I' being positive). This will effectively decrease the control input to multiplier 22 to reduce the magnitude of vector A to provide corrected vector A'. Vector D, on the other hand, results in a negative value of $\Delta I'_w$ from LUT 34, which also provides a negative error value from LUT 52 since the chart of FIG. 9B is used (I' being negative). Thus the control input to multiplier 22 is again decreased to reduce the magnitude of vector D for providing corrected vector D'. In the case of insufficient gain, the control input to multiplier 22 will be increased (e.g. for both vectors J and M) to increase the gain imposed on the demodulated data signal to provide corrected vectors J' and M'. As in the case of offset adjustment, it will be seen that the gain adjustment is more sensitive to small values of Q where amplitude errors in the demodulated data predominate. Above a selected threshold, the rate of change of the gain adjustment does not vary with $\Delta I'_w$ for a given value of Q.

Also, as in the case of the phase error correction loop, it will be noted that the offset and gain error adjustment loops are reset at the beginning of each data field to initially rapidly update the respective adjustments in response to the received reference signal, and then to subsequently track errors in the received demodulated data at a slower rate, the latter preferably being related to the S/N ratio of the received signal.

As mentioned previously, the constellation of the demodulated data may have different numbers of data levels, such as four and sixteen. Since the contents of LUT's 32 and 34 are dependent on the constellation in use, a constellation select input is provided to each LUT so that an appropriately programmed section of each memory may be utilized. Also, in certain cases it may be desirable to use a linear comb filter in the I output channel of detector 14 to reduce certain types of interference. Use of such a comb filter introduces additional levels in the constellation which also can be accommodated by using the constellation select input to select appropriately programmed sections of each memory.

It is recognized that numerous changes in the described embodiments of the invention will be apparent to those skilled in the art without departing from its true scope and spirit. The invention is to be limited only as defined in the claims.

We claim:
1. A phase noise tracking circuit comprising:
means for receiving a complex data signal having an in-phase data component and a related quadrature component;
means for recovering said in-phase data component from said received signal;
means for approximating said quadrature component from said recovered in-phase data component; and
means for adjusting the phase of the vector comprising said recovered in-phase data component and said approximated quadrature component to reduce the phase noise characterizing said recovered in-phase data component.

2. The circuit of claim 1 wherein said adjusting means comprises means for adjusting the phase of said vector at a rate dependent upon the value of said approximated quadrature component.

3. The circuit of claim 1 wherein said adjusting means comprises means for adjusting the phase of said vector at a rate dependent upon the S/N ratio of said received signal.

4. The circuit of claim 1 wherein said adjusting means comprises means for adjusting the phase of said vector at a rate dependent upon the difference between the level of said recovered in-phase data component and the closest valid level thereof.

5. The circuit of claim 1 wherein said received signal comprises a plurality of successive data fields each including a reference signal which is more reliably recoverable than the remainder of the respective data field and wherein said adjusting means is responsive to said reference signal for adjusting the phase of said vector at a first relatively rapid rate.

6. The circuit of claim 5 wherein said adjusting means is responsive to said remainders of each of said data fields for adjusting the phase of said vector at a rate which is less than said first rate and which is dependent upon the S/N ratio of said received signal.

7. The circuit of claim 6 including means responsive to said reference signal for estimating the S/N ratio of said received signal for each of said data fields.

8. The circuit of claim 7 including means for resetting said adjusting means and said S/N ratio estimating means at the beginning of each of said data fields.

9. The circuit of claim 1 wherein said adjusting means comprises means for developing an error signal representing the difference between said recovered in-phase data component and the closest valid value thereof, means for accumulating said error signal and means for rotating said vector by an amount and in a direction corresponding to said accumulated error signal.

10. The circuit of claim 9 wherein said error signal developing means comprises means for developing said error signal in response to the value of said approximated quadrature component.

11. The circuit of claim 9 wherein said error signal developing means comprises means for developing said error signal in response to the S/N ratio of said received signal.

12. The circuit of claim 9 wherein said received signal comprises a plurality of successive data fields each including a reference signal which is more reliably recoverable than the remainder of the respective data field and wherein said error signal developing means is responsive to said reference signal for developing said error signal for adjusting the phase of said vector at a first relatively rapid rate.

13. The circuit of claim 12 wherein said error signal developing means is responsive to said remainders of each of said data fields for developing said error signal for adjusting the phase of said vector at a rate which is less than said first rate and which is dependent upon the S/N ratio of said received signal.

14. The circuit of claim 13 including means responsive to said reference signal for estimating the S/N ratio of said received signal for each of said data fields.

15. The circuit of claim 14 including means for resetting said S/N ratio estimating means and said accumulating means at the beginning of each of said data fields.

16. The circuit of claim 1 wherein said approximating means comprises means for performing an approximate Hilbert transform of said recovered in-phase data component.

17. The circuit of claim 1 wherein said adjusting means comprises decision feedback means responsive to a selected one of a plurality of tables of valid levels of said recovered in-phase data component.

18. A circuit for error correcting a selected characteristic of a received signal comprising:
   means for receiving a complex data signal having an in-phase data component and a related quadrature component;
   means for recovering said in-phase data component from said received signal and for approximating said quadrature component from said recovered in-phase data component; and
   means responsive to said recovered in-phase data component and said approximated quadrature component for error correcting said selected characteristic of said received signal.

19. The circuit of claim 18 wherein said means for error correcting comprises means for adjusting the phase of the complex signal comprising said recovered in-phase data component and said approximated quadrature component.

20. The circuit of claim 18 wherein said means for approximating comprises means for performing an approximate Hilbert transform on said recovered in-phase data component for deriving said quadrature component.

21. The circuit of claim 19 wherein said means for error correcting comprises means for adjusting the phase of said complex signal comprising said recovered in-phase data component and said approximated quadrature component at a rate dependent upon the value of said phase adjusted quadrature component.

22. The circuit of claim 19 wherein said means for error correcting comprises means for developing an error signal representing the difference between said phase adjusted in-phase data component and a plurality of stored values, means for accumulating said error signal and means responsive to said accumulated error signal for adjusting the phase of said complex signal comprising said recovered in-phase data component and said approximated quadrature component.

23. The circuit of claim 22 wherein said error signal developing means comprises means responsive to said phase adjusted quadrature component for developing said error signal.

24. The circuit of claim 22 wherein said error signal developing means comprises means responsive to the S/N ratio of said received signal for developing said error signal.

25. The circuit of claim 22 wherein said received signal comprises a periodically occurring reference signal and including means responsive to said reference signal for estimating the S/N ratio of said received signal and means for resetting said estimating means and said accumulating means at a rate corresponding to the rate of said periodically occurring reference signal, said error signal developing means being responsive to said reference signal for developing said error signal for adjusting the phase of said complex signal comprising said recovered in-phase data component and said approximated quadrature component at a first relatively rapid rate and otherwise responsive to said estimating means for developing said error signal for adjusting the phase of said complex signal comprising said recovered in-phase data component and said approximated quadrature component at a rate which is less than said first rate and which is dependent upon said estimated S/N ratio.

26. A circuit for correcting errors in a received signal comprising:
   means for receiving a complex data signal having an in-phase data component and a related quadrature component;
   means for recovering said in-phase data component from said received signal and a quadrature signal representing said quadrature component;
   means for adjusting the complex signal comprising said recovered in-phase data component and said quadrature signal for error correcting a selected characteristic thereof; and
   means responsive to said error corrected complex signal for controlling said adjusting means for correcting said selected characteristic at a rate which is a function of the value of said quadrature signal.

27. The circuit of claim 26 including means responsive to said recovered in-phase data component for approximating said quadrature signal.

28. The circuit of claim 27 wherein said approximating means comprises an approximate Hilbert transform.

29. The circuit of claim 26 wherein said adjusting means comprises means for adjusting the phase of the complex signal comprising said recovered in-phase component and quadrature signal.

30. The circuit of claim 26 wherein said controlling means comprises means for controlling said adjusting means for error correcting said selected characteristic at a rate which is a direct function of the value of said quadrature signal.

31. The circuit of claim 26 wherein said adjusting means comprises means for adjusting an amplitude-related characteristic of said received complex signal.

32. The circuit of claim 31 wherein said controlling means comprises means for controlling said adjusting means as an inverse function of the value of said quadrature signal.

33. The circuit of claim 32 wherein said adjusting means comprises means for adjusting the gain of said received complex signal.

34. The circuit of claim 32 wherein said adjusting means comprises means for adjusting the offset of said received complex signal.

35. The circuit of claim 26 wherein said controlling means comprises means for controlling said adjusting means for error correcting said selected characteristic as a function of the S/N ratio of said received signal.

36. The circuit of claim 32 wherein said controlling means comprises means for developing an error signal representing the difference between said error corrected in-phase data component and a plurality of stored values, means for accumulating said error signal and means responsive to said accumulated error signal for controlling said adjusting means.

37. The circuit of claim 36 wherein said received signal comprises a periodically occurring reference signal and including means responsive to said reference signal for estimating the S/N ratio of said received signal and means for resetting said estimating means and said accumulating means at a rate corresponding to the rate of said periodically occurring reference signal, said error signal developing means being responsive to said reference signal for developing said error signal for adjusting said selected characteristic at a first relatively rapid rate and otherwise responsive to said estimating means for developing said error signal for adjusting said selected characteristic at a rate which is less than said first rate and which is dependent upon said estimated S/N ratio.

38. A circuit for correcting errors in a received signal comprising:
    means for receiving a data signal including a periodically occurring reference signal; and
    means responsive to said reference signal for initially error correcting a selected characteristic of said received signal at a first relatively rapid rate and subsequently operable for error correcting said selected characteristic at a rate which is less than said first rate.

39. A circuit for correcting errors in a received signal comprising:
    means for receiving a data signal including a periodically occurring reference signal;
    means for estimating the S/N ratio of said received signal; and
    means responsive to said reference signal for initially error correcting a selected characteristic of said received signal at a first relatively rapid rate and subsequently responsive to said estimating means for error correcting said selected characteristic at a rate which is less than said first rate.

40. The circuit of claim 39 wherein said estimating means is responsive to said reference signal for estimating the S/N ratio of said received signal.

41. The circuit of claim 40 including means for resetting said error correcting means at a rate corresponding to the rate of said periodically occurring reference signal.

42. A circuit for correcting errors in a received signal comprising:
    means for receiving a data signal comprising a plurality of successively occurring data fields each including a predetermined reference signal;
    means responsive to said reference signal for initially error correcting a selected characteristic of said received signal at a first relatively rapid rate and subsequently operable for error correcting said selected characteristic at a second rate not exceeding said first rate; and
    means for resetting said error correcting means at the beginning of each of said data fields.

43. The circuit of claim 42 wherein said second rate is less than said first rate.

44. The circuit of claim 42 including means for estimating the S/N ratio of said received signal and wherein said error correcting means is responsive to said estimated S/N ratio for error correcting said selected characteristic at said second rate.

45. The circuit of claim 44 wherein said estimating means is responsive to said reference signal for estimating the S/N ratio of said received signal.

46. The circuit of claim 44 wherein said error correcting means is responsive to said estimated S/N ratio for selecting said second rate from among a plurality of different rates.

47. The circuit of claim 46 wherein each of said plurality of different rates is less than said first rate.

* * * * *